United States Patent
Le Besnerais

(10) Patent No.: US 8,816,547 B2
(45) Date of Patent: Aug. 26, 2014

(54) ELECTRIC MACHINE WITH COOLING ARRANGEMENT

(75) Inventor: Jean Le Besnerais, Mons en Baroeul (FR)

(73) Assignee: Siemens Aktiengesellschaft, Munich (DE)

( * ) Notice: Subject to any disclaimer, the term of this patent is extended or adjusted under 35 U.S.C. 154(b) by 211 days.

(21) Appl. No.: 13/084,985

(22) Filed: Apr. 12, 2011

(65) Prior Publication Data

US 2011/0266897 A1 Nov. 3, 2011

(30) Foreign Application Priority Data

Apr. 28, 2010 (EP) .................................. 10161244

(51) Int. Cl.
*H02K 9/19* (2006.01)
*H02K 9/08* (2006.01)
*H02K 1/20* (2006.01)
*H02K 5/20* (2006.01)
*H02K 7/18* (2006.01)

(52) U.S. Cl.
CPC .. *H02K 1/20* (2013.01); *H02K 9/08* (2013.01); *H02K 7/1838* (2013.01); *Y02E 10/725* (2013.01)
USPC .......................... 310/64; 310/65; 310/216.016

(58) Field of Classification Search
CPC .............. H02K 1/20; H02K 9/08; H02K 9/18; H02K 9/19; H02K 9/197; H02K 5/20
USPC ................. 310/65, 52–64, 216.014, 216.056, 310/216.119, 216.016

IPC .................... H02K 1/20,9/14, 9/16, 5/20, 9/197
See application file for complete search history.

(56) References Cited

U.S. PATENT DOCUMENTS

| | | | | |
|---|---|---|---|---|
| 3,475,631 A * | 10/1969 | Stark et al. | ...................... | 310/58 |
| 5,491,371 A * | 2/1996 | Ooi | ................................ | 310/58 |
| 2002/0074872 A1* | 6/2002 | Wetzel et al. | .................. | 310/61 |
| 2004/0069453 A1 | 4/2004 | Tanaka et al. | | |
| 2007/0013241 A1* | 1/2007 | Schiferl et al. | ................. | 310/54 |
| 2009/0115268 A1* | 5/2009 | Fleming et al. | ................. | 310/52 |
| 2009/0121564 A1* | 5/2009 | Pal et al. | ......................... | 310/58 |
| 2009/0230790 A1* | 9/2009 | Weiss | .............................. | 310/61 |
| 2010/0102656 A1* | 4/2010 | Booth et al. | ................... | 310/64 |

FOREIGN PATENT DOCUMENTS

| | | |
|---|---|---|
| DE | 10 2008 03589 A1 | 2/2010 |
| FR | 22 894 E | 9/1921 |
| JP | 59172953 A | 9/1984 |
| WO | WO 2010/107306 A1 | 9/2010 |

OTHER PUBLICATIONS

"Vane." Collins English Dictionary—Complete & Unabridged 10th Edition. Harper Collins Publishers. Mar. 28, 2013. <Dictionary.com http://dictionary.reference.com/browse/vane>.*

* cited by examiner

*Primary Examiner* — Michael Andrews

(57) ABSTRACT

An electric machine is provided. The electric machine includes a stator, a rotor and a closed cooling channel through which a gaseous cooling medium circulates. The stator includes a stator lamination at least partially encasing several stator windings. The closed cooling channel is disposed in circumferential direction of the stator lamination. The stator lamination is at least partially formed as fins.

11 Claims, 2 Drawing Sheets

ELECTRIC MACHINE WITH COOLING ARRANGEMENT

CROSS REFERENCE TO RELATED APPLICATIONS

This application claims priority of European Patent Office application No. 10161244.8 EP filed Apr. 28, 2010, which is incorporated by reference herein in its entirety.

FIELD OF INVENTION

The invention relates to an electric machine having a stator comprising a stator laminate at least partially encasing several stator windings, a rotor and a cooling means in which a gaseous cooling medium circulates.

BACKGROUND OF INVENTION

Electric machines and generators in general are becoming more compact due to competitive pressures. The smaller these machines get, the greater the heat density they will generate. Nowadays, with the advancement of power electronics, electric machines are being driven by means of variable speed drive units presenting an additional heat source due to the harmonics supplied by the inverter. When such machines are operated at low speed the cooling performance is further negatively affected. All of these factors lead to a temperature rise in the machine which will greatly affect its performance and life expectancy.

In air cooled electric machines and especially in wind turbine generators most heat losses arise from so called copper losses. The exceeding heat has to be removed to avoid so called "hot spots" or insulation wearing.

Therefore, the stator laminate or stator stack is generally air cooled by blowing air through the end windings into the air gap as well as through radial ducts disposed within the stator. Alternatively, direct water cooling of stators by means of pipes or hollow copper strands is known for this purpose.

SUMMARY OF INVENTION

However, the present measures do not provide a satisfying cooling performance of the electric machine in particular regarding the stator.

Hence, it is an object of the invention to provide an electric machine having improved cooling capability, particularly regarding the stator.

This is achieved by an electric machine as described above, wherein the cooling means is a closed cooling channel disposed in circumferential direction of the stator laminate and the stator lamination is at least partially formed as fins.

The invention is based on the idea to use at least one part of the stator lamination as fins that is integrally forming fins out of the stator laminate, which is thin enough to have good fin properties. The fins are created by simply extending some lamination sheets, thereby increasing the surface of the stator lamination giving rise to an improved heat exchange. Preferably, the fins project radially inward. Number, size and shape of the fins are not limited. The fins drag heat from the inner stator lamination generated during the use of the electric machine. Consequently, the fins can be efficiently used by blowing a gaseous cooling medium, which is preferably air, below the stator lamination or stator stack in circumferential direction. Additionally, a cooling means in the shape of a closed cooling channel or chamber is formed all along the circumferential length of the stator lamination, i.e. the stator yoke. The gaseous cooling medium is blown through the cooling channel giving rise to proper and controlled gas flow. Due to the closeness of the cooling channel it is assured that all relevant parameters of the gaseous cooling medium are easily controllable and/or monitorable. During circulation through the cooling channel the gaseous cooling medium is being heated by the heat accumulated in the fins i.e. the fins dissipate heat from the stator to the gaseous cooling medium. Thus, heat is efficiently transferred from the stator to the gaseous cooling medium by means of the fins. Hence, proper cooling of the stator is achieved.

In favour, the fins are circumferentially disposed in axial direction in ring-like manner. In such a way, proper and efficient circulation of the gaseous cooling medium is provided within the cooling channel. Fins may be considered as adjacently disposed rings extending from the stator lamination. The fins may be uniformly distributed in axial direction. Besides, it is possible that fins are only disposed at certain portions of the stator, i.e. certain sections of the stator having an essentially round shape.

Preferably, the closed cooling channel is disposed radially inside the stator lamination. The cooling channel may act as a housing means for the fins and may be stably attached to the stator or any other mounting means. The closed cooling channel may be made of plastic material for instance.

It is also possible, that the cooling channel is axially extended so as to include the ends of the stator windings. Thereby, proper cooling of the ends of the stator windings, i.e. the end windings is achieved. The ends of the stator windings are regularly barely exposed that is surrounded by air which may lead to problematic heat accumulation in this region of the stator. By extending the cooling channel so that the ends of the stator windings are included the undesired generation of local "hot spots" may be avoided.

It is of additional advantage when gas circulation means providing gas circulation through the ends of the stator windings are disposed within the axially extended portions of the cooling channel allowing the gaseous medium to circulate through the ends of the stator windings. Thus, controlled and more efficient gas flow is provided through preferably all ends of the stator windings by means of gas circulation means that is the gas flow circulation is concertedly directed through the ends of the stator windings and/or any other relevant portion of the stator. The gas circulation means are specifically shaped components being capable of directing gas streams to certain desired positions. Hence, heat accumulation in the ends of the stator windings which will negatively affect the operation of the entire electric machine is avoided or at least reduced.

In favour, at least one internal heat exchanger is disposed within the cooling channel. The internal heat exchanger removes heat from the heated gaseous cooling medium, thereby assuring that cooling of the electric machine or stator respectively is executed in terms of a cycle as the gaseous cooling medium circulates through the fins. Thereby, the gaseous cooling medium warms up, i.e. cools the fins and the stator respectively and at last dissipates the heat to the internal heat exchanger whereafter the gaseous cooling medium itself is cooled and further ready to circulate through the fins so that the cooling cycle may start over. It is possible that a number of internal heat exchangers may be distributed within the closed cooling channel.

The internal heat exchanger may be a water/air heat exchanger having high efficiency in terms of heat exchange. Water/air heat exchangers work in known manner, whereby a heated gas dissipates its thermal energy to a liquid cooling medium circulating inside the heat exchanger. Thereby, the liquid cooling medium inside the heat exchanger is heated while the gas is cooled. It is understood that other types of heat exchangers are applicable as well.

It is preferred, that at least one fan is allocated to the internal heat exchanger. The fan which is regularly controlled by a control unit provides circulation of the gaseous cooling medium through the closed cooling channel. In dependence of the fan speed diverse gas flow profiles may be adjusted. Further, the fan speed may vary according to external conditions, whereby in comparatively cold environments the fan will rather work at low rotation, while in comparatively warm environments the fan will rather work at high rotation. If need be, a number of fans may be provided.

In a preferred embodiment of the invention the internal heat exchanger is thermally coupled to an external heat exchanger. Thus, the heat accumulated within the internal heat exchanger is dissipated to one or more external heat exchanger(s) releasing the heat to the environment of the electric machine after all. In such a manner, it is assured that the internal heat exchanger is always ready to absorb heat from the gaseous cooling medium and is not endangered to overheat or at least reduced in its efficiency or cooling efficiency ratio respectively. The external heat exchanger may be a passive cooler that has essentially no power consumption. The external heat exchanger may therefore be exposed to the environment and cooled by wind for example.

The inventive electric machine is preferably arranged with the rotor disposed outside the stator.

As mentioned above, the gaseous cooling medium is preferably air. Of course, other types of gases in particular having better cooling properties that is heat conveyance properties are applicable as well.

BRIEF DESCRIPTION OF THE DRAWINGS

In the following the invention is described in detail as references made to the figures, whereby.

DETAILED DESCRIPTION OF INVENTION

Figure 1:
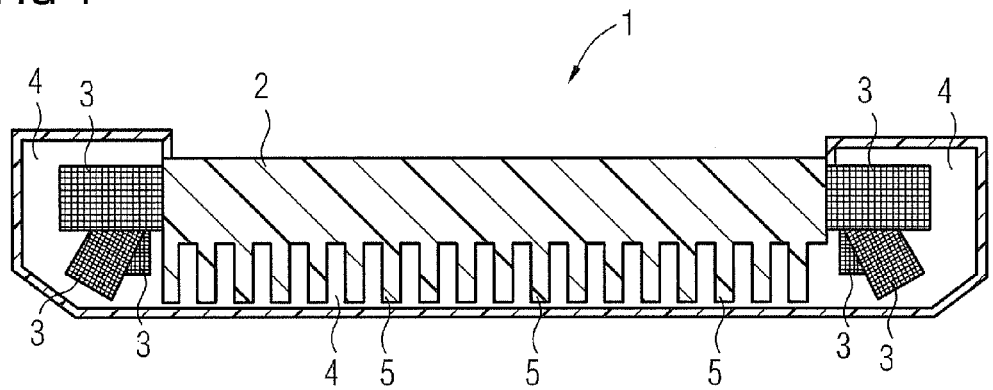
FIG. 1 shows a principle detail cut view of a stator of an inventive electric machine according to an exemplary embodiment of the invention.

FIG. 1 shows a principle detail view of a stator 1 of an electric machine according to an exemplary embodiment of the invention, whereby essentially only relevant parts in view of the invention that is the stator 1 comprising a stator lamination 2 or stator stack encasing the stator windings, whereof only the ends, i.e. the end windings 3 can be seen, are depicted. The stator 1 comprises a cooling means in form of a closed cooling channel 4 through which a gaseous cooling medium like air for example circulates. The cooling channel 4 is radially disposed inside the stator lamination 2. It is discernible that the stator lamination 2 is partially formed as radially inward projecting fins 5 which is possible as the stator lamination 2 is thin enough to show good fin properties.

Hence, the heat exchange surface of the stator 1 and stator lamination 2 respectively is significantly increased.

The fins 5 are circumferentially adjacently disposed in axial direction of the stator 1 in ring-like manner, whereby only the upper portion of the rings can be seen in FIG. 1. Thus, the stator 1 is cooled with a circumferential air flow and stator lamination 2 is used as fins 5. In comparison to traditional air-cooled electric machine the large pressure drop due to the cooling flow passing from the cooling channel to the air gap and due to air ducts is avoided.

The cooling channel 4 is axially extended so as to include the end windings 3 of the stator 1. Hence, the occurrence of local "hot spots" in this region is prevented as proper cooling of the end windings 3 is assured by means of air circulating through the end windings 3.

Figure 2:
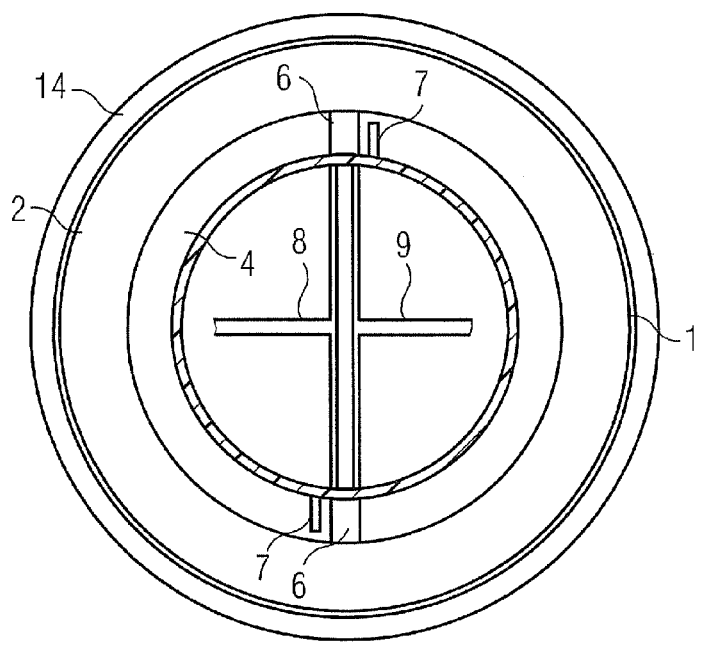
FIG. 2 shows a principle detail axial view of a stator of an electric machine according to an exemplary embodiment of the invention.

As can be seen from FIG. 2 showing a principle detail axial view of a stator 2 of an electric machine according to an exemplary embodiment of the invention exemplary two internal heat exchangers 6, i.e. water/air heat exchangers with allocated fans 7 are oppositely disposed within the cooling channel 4. The internal heat exchangers 6 are connected to coolant liquid providing supply lines 8, 9, whereby line 8 supplies the internal heat exchangers 6 with cold coolant and line 9 conducts heated coolant from the internal heat exchangers 6. The coolant or cooling liquid may be water for example. The fans 7 provide proper circulation of air within the cooling channel 4 for instance in counter-clockwise direction. The rotation of the fans 7 is controlled by a control unit (not shown). Due to the significantly increased heat exchange surface of the stator lamination 2 by means of the fins 5 smaller air flows are applicable, consequently fan power may be downsized. The rotor 14 is disposed outside the stator 1, as discernible.

Cooling of the stator 1 is provided in tell is of a cooling cycle, as during the circulation of the gaseous cooling medium within the cooling channel 4 and through the fins 5 heat exchange takes place on the surface of the fins 5, so that the fins 5 transfer heat to the gaseous cooling medium which is consequently warming up. As the gaseous cooling medium is steadily circulating within the cooling channel 4 by means of the fans 7, the heated gaseous cooling medium is transferred to the internal heat exchangers 6, whereby the heat is dissipated to the coolant inside the heat exchangers 6, thereby cooling the gaseous cooling medium.

Figure 3:
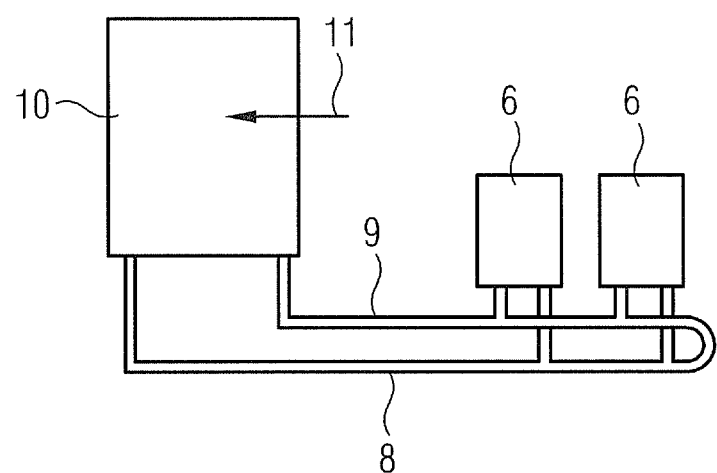
FIG. 3 shows a principle detail view of an internal and external heat exchanger of an electric machine according to an exemplary embodiment of the invention.

As depicted in FIG. 3 the internal heat exchangers 6 are thermally coupled to an external heat exchanger 10 by means of the lines 8, 9. The external heat exchanger 10 is adapted to supply the internal heat exchangers 6 with cold coolant through line 8 ready to absorb heat from the gas flow circulating through the cooling channel 4. Therefore, the external heat exchanger 10 must provide cooling of the hot coolant supplied from the internal heat exchangers 6 through line 9 as the coolant runs in a cycle-like manner between the internal heat exchangers 6 and the external heat exchanger 10. The external heat exchanger 10 is a passive cooler. As a consequence, cooling of the heated coolant by means of the external heat exchanger 10 is achieved by the use of wind for instance, whereby the wind streams along the surface of the external heat exchanger 10 as denoted by arrow 11. Hence, the external heat exchanger 10 has not to be disposed in close proximity to the electric machine as the distance between the external heat exchanger 10 and the internal heat exchangers 6 is bridged by the lines 8, 9.

Figure 4:
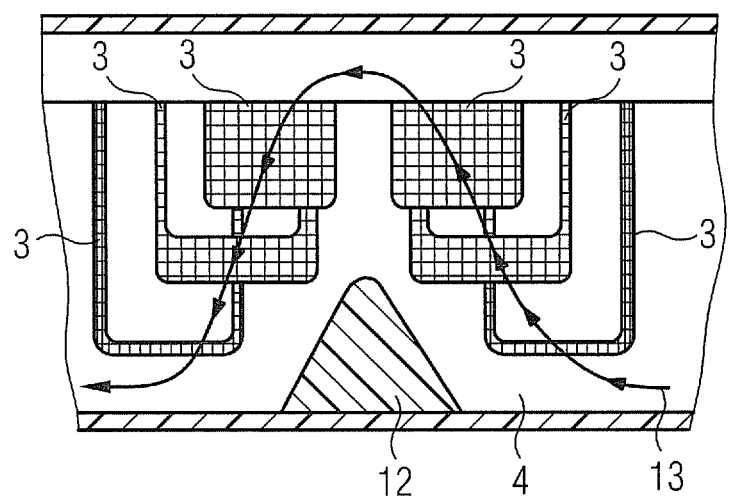
FIG. 4 shows a principle detail view of a gas circulation means of an inventive electric machine according to an exemplary embodiment of the invention.

FIG. 4 shows a principle detail view of a gas circulation means 12 of an inventive electric machine according to an exemplary embodiment of the invention. The gas circulation means 12 is disposed within the axially extended portions of the cooling channel 4. Due to the gas circulation means 12 air or any other gaseous cooling medium is directed through the end windings 3 as denoted by arrows 13 due to the special shape of the gas circulation means 12. Hence, a concerted gas stream is provided in the region of the end windings 3 giving rise to proper cooling of the end windings 3, which are usually known as endangered in terms of overheating due to the accumulation of heat.

The invention claimed is:

1. An electric machine, comprising:
an inner stator comprising:
a plurality of stator windings; and
a stator lamination at least partially encasing the plurality of stator windings, wherein the stator lamination is at least partially formed as fins that project radially inwardly from the stator lamination;
an outer rotor; and
a closed cooling channel through which a gaseous cooling medium circulates, the closed cooling channel being disposed radially inside the stator lamination and extending all along a circumferential length of the stator lamination, wherein the closed cooling channel is delimited by the stator lamination such that the closed cooling channel is isolated from an air gap between the inner stator and the outer rotor, whereby the gaseous cooling medium is prevented from flowing into the air gap.

2. The electric machine according to claim 1, wherein the fins are configured in a ring-like manner, and are spaced and distributed along an axial direction, wherein the cooling channel is formed at the interspaces between axially adjacent fins.

3. The electric machine according to claim 1, wherein the closed cooling channel is axially extended to include ends of the stator windings.

4. The electric machine according to claim 3, further comprising a gas circulation device providing gas circulation through the ends of the stator windings, the gas circulation device being disposed within the axially extended portions of the cooling channel and having a shape that allows the gaseous cooling medium to circulate through the ends of the stator windings.

5. The electric machine according to claim 1, further comprising an internal heat exchanger disposed within closed the cooling channel for dissipating heat from the gaseous coolant medium.

6. The electric machine according to claim 5, further comprising at least one fan allocated to the internal heat exchanger for circulating the gaseous coolant medium inside the closed cooling channel.

7. The electric machine according to claim 5, wherein the internal heat exchanger dissipates heat from the gaseous coolant medium to a coolant inside the internal heat exchanger, wherein the internal heat exchanger is thermally coupled to an external heat exchanger to provide cooling to the coolant.

8. The electric machine according to claim 7, wherein the external heat exchanger is a passive cooler.

9. The electric machine according to claim 5, wherein the internal heat exchanger is selected from the group comprising water heat exchanger and air heat exchanger.

10. The electric machine according to claim 1, wherein the gaseous cooling medium is air.

11. The electric machine according to claim 1, wherein the cooling channel is configured as a housing for the fins.

* * * * *